United States Patent [19]

Peterson et al.

[11] 4,078,524
[45] Mar. 14, 1978

[54] ANIMAL WATERING APPARATUS

[75] Inventors: Jerry D. Peterson, Conrad; Gerald L. Knief, Grundy Center, both of Iowa

[73] Assignee: Ritchie Industries, Inc., Conrad, Iowa

[21] Appl. No.: 705,614

[22] Filed: Jul. 15, 1976

[51] Int. Cl.² .............................................. A01K 7/00
[52] U.S. Cl. ................................................. 119/71
[58] Field of Search ...................... 119/71, 72, 72.5, 75, 119/81, 51.5, 51.11, 16, 20, 27

[56] References Cited

U.S. PATENT DOCUMENTS

| 3,352,286 | 11/1967 | Pickelsimer | 119/71 |
| 3,628,506 | 12/1971 | Glasbergen | 119/71 |

FOREIGN PATENT DOCUMENTS

| 231,498 | 1960 | Australia | 119/71 |
| 519,245 | 1955 | Canada | 119/71 |
| 235,960 | 1945 | Switzerland | 119/71 |
| 760,391 | 1956 | United Kingdom | 119/71 |

Primary Examiner—Louis G. Mancene
Assistant Examiner—Peter K. Skiff
Attorney, Agent, or Firm—Henderson, Strom & Sturm

[57] ABSTRACT

An animal watering device of a type having an enclosed housing with a plurality of nipple valves extending from the sides of the housing for allowing animals such as hogs to drink directly therefrom. A base plate having radially outwardly extending flanges thereon is disposed on the housing surrounding each of the nipple valves for the purpose of forcing the animal watering therefrom to align itself in the same general direction that the valve extends from the housing thereby preventing substantial water loss, undesirable water spillage and allowing more animals to efficiently use the waterer than has heretofore been achievable.

2 Claims, 9 Drawing Figures

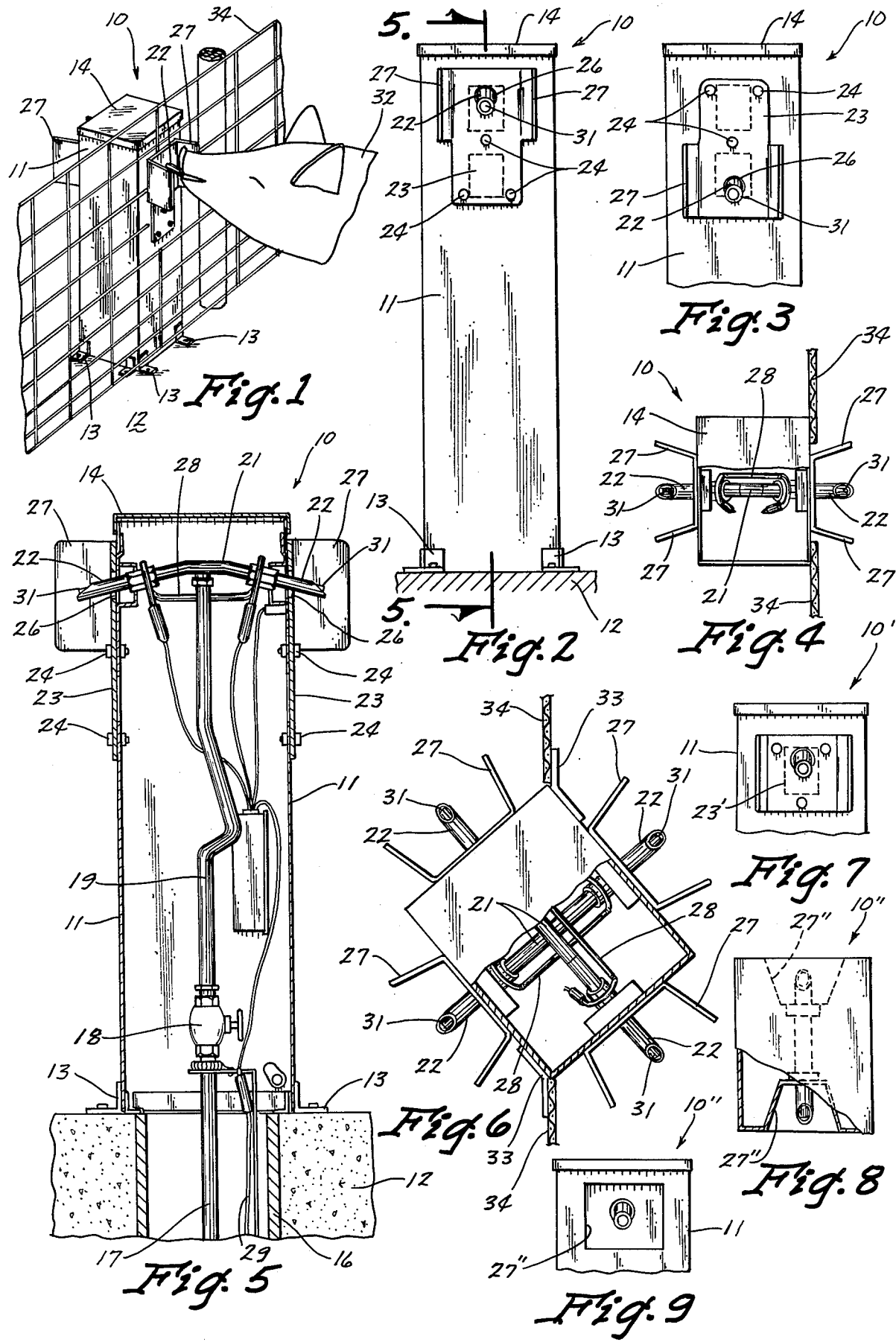

ANIMAL WATERING APPARATUS

BACKGROUND OF THE INVENTION

The present invention relates generally to animal waterers and more particularly to animal waterers of the type commonly referred to as "nipple" waterers which are in common use for watering animals such as hogs.

One of the main problems with the use of nipple valves, as opposed to those types of watering devices which have a container into which the water is delivered and from which the animals drink, is that much water can be wasted if the animal is not lined up with the valve, that is to say if the animal tries to drink from one side of the valve, which is a very common situation. If the animal is lined up with the valve, very little water is emitted from the valve which is not consumed by the animal. However, if the animal is to one side, it has been found that a significant amount of water is lost. This could be very important if the amount of water available is limited; and, even in situations where water loss is not an important factor, it is very undesirable to have large quantities of water spilled around the waterer itself. Such wet conditions around a watering device tends to spread diseases and encourage undesirable bacteria and insect life around the waterer. This condition can also have an adverse effect by promoting rust and corrosion on the watering device itself, thereby shortening the service life of the waterer.

SUMMARY OF THE INVENTION

The present invention relates to an animal watering apparatus including a housing having generally vertically disposed side walls thereon. Nipple valves are attached to at least one of the side walls and such nipple valves extend outwardly therefrom for allowing animals to drink directly therefrom. A pair of radially extending flange members are disposed on each side of the nipple valve for the purpose of preventing an animal from drinking from the nipple valve unless it is substantially aligned with direction of extension of the nipple valve, thereby preventing substantial water loss.

According to another aspect of the invention, the flange members are connected to a base plate having an opening therein through which the nipple valve extends. Structure is also provided for facilitating a change of the height of the valve and flange members with respect to the housing of the watering apparatus.

An object of the present invention is to force animals such as hogs to drink from a nipple valve only when such animal is substantially aligned with the direction of extension of the valve and substantially preventing the animal from drinking when such alignment condition between the valve and the animal is not effected.

Another object of the present invention is to reduce water loss from a nipple valve watering apparatus and to increase the rate of consumption by the animal drinking therefrom.

A further object of the invention is to eliminate the formation of a wet condition around a watering apparatus caused by spillage therefrom when an animal is drinking water.

Still another object of the invention is to prevent animals drinking from a watering device from interfering with one another, thereby increasing the efficiency of the watering apparatus and thereby increasing the capacity or number of animals which may adequately be served by a particular watering apparatus.

Other objects, advantages and novel features of the present invention will become apparent from the following detailed description of the invention when considered in conjunction with the accompanying drawings.

BRIEF DESCRIPTION OF THE DRAWINGS

FIG. 1 is a perspective view of one embodiment of the present invention showing a hog drinking therefrom;

FIG. 2 is a front elevational view of the watering apparatus of FIG. 1;

FIG. 3 is a view like FIG. 2, but showing the watering height in an adjusted position;

FIG. 4 is a plan view, having a portion broken away to illustrate the interior of the watering apparatus;

FIG. 5 is a cross-sectional view taken along line 5—5 of FIG. 2;

FIG. 6 shows a plan view of another embodiment of the present invention having four watering valves thereon and fence brackets for installing such device in a fence line;

FIG. 7 is a front elevational view of an alternate embodiment of the present invention;

FIG. 8 is a plan view of another alternate embodiment of the present invention; and FIG. 9 is a front elevational view of the alternate embodiment of FIG. 8.

DESCRIPTION OF THE PREFERRED EMBODIMENT

Referring now to the drawings wherein like reference numerals designate identical or corresponding parts throughout the several views, FIG. 1 shows an animal watering device 10 constructed in accordance with the present invention. The animal watering device 10 has a plurality of side walls 11 which are bolted to a concrete platform 12 by a plurality of brackets 13 rigidly attached to the side walls 11, such as by welding. A top cover 14 is removably disposed on the top thereof.

Referring to FIG. 5, it can be seen that a tile 16 extends down through the concrete platform 12 and provides an air passageway for the passage of warm ground air upwardly therethrough, which is desirable during cold weather to prevent the interior pipes from freezing. A water supply pipe 17 extends up through center of the tile 16. At the top of water supply pipe 17 is a valve 18 for the purpose of selectively turning the water on or off to the watering device and for facilitating installation and repair of the watering apparatus 10. A flexible hose or pipe 19 is attached to the top end of the valve 18, the other end of which is connected to a metal pipe coupling 21. Conventional nipple valves 22 are sealingly connected to the pipe 21 by conventional means, such nipple valves being of a type shown in U.S. Pat. Nos. 3,613,642; 3,691,997 and 3,777,714.

A plurality of base plates 23 are bolted to the side walls 11 of the watering apparatus 10 by means of nut and bolt devices 24. Openings 26 are disposed in the base plates 23 for the purpose of allowing the nipple valves 22 to extend from the inside of the housing including walls 11 to the outside thereof. Seals, not shown, are provided for insuring that the inside of the waterer is sealed with respect to the outside in the wintertime so that the interior plumbing will not freeze.

A pair of plate members 27 are attached to the base plate 23 and these flange members extend outwardly in the same general direction as each respective nipple valve 22; but, in their preferred form, they are spaced apart from the valve more at the free ends thereof than at their connection to the base plate 23 and side walls 11.

In operation, the watering apparatus 10 is installed substantially as shown in FIGS. 1-5 including properly wired heating elements 28 and 29 which are thermostatically controlled by conventional structures, and which heating elements and their associated structures constitute novel inventions apart from the present invention. The valve 18 is set so that it is open, thereby providing a supply of water under pressure to the nipple valves 22. When a hog or other animal places its mouth around the valve 22 and contacts the control member 31, water flows out of the valve 22.

As discussed above, the problem has been that the animals quite often drink from one side of the valve and this causes large quantities of water to be spilled out of the animal's mouth and onto the concrete platform 12 therebelow. However, because of the provision of flange members 27, the animal cannot reach the valve 22 when positioned at one side thereof, so the animal must instead align itself substantially with the direction of the valve 22 as shown generally be the hog 32 drinking from the valve 22 in FIG. 1. This also tends to prevent other animals desiring to drink at the same time, from pushing their mouth onto the valve 22 from the side thereof. If animals of a smaller variety, such as small pigs, are to use the watering device 10, it may be desirable to remove at least the two lowermost bolts 24 as shown in FIG. 2, pull the nipple valve 22 from the inside out of the opening 24 and then pivoting the base plate 23 around to the position shown in FIG. 3. Bolts 24 are then put back in place and the nipple valve 22 placed through the opening again. The pipe or hose 19 is flexible to facilitate this raising, lowering, and repositioning of the nipple valves 22. It can be seen, then, in FIG. 3 that the nipple valve 22 is lower than in the position shown in FIG. 2.

Referring now to FIG. 6, a slightly modified version of the present invention is shown. Fence brackets 33 are attached to the side walls 11 by any conventional means, such as by bolting. These fence brackets 33 are also connected by any conventional means to the fence 34. In the FIG. 6 embodiment, identical watering structures are formed on all four sides thereof, instead of only on two sides. This, of course, allows additional animals to drink from the watering device at the same time that other animals are drinking therefrom. It is important to note that animals drinking from such a device on one side of the fence will not interfere with each other, so long as they are drinking, since the adjacent valves 22 are at right angles to each other. This is to be distinguished from prior art devices whereby animals on the same side of the fence could be bumped into one another while drinking, thereby causing one or the other of the animals mouths to be moved from the valve 22, resulting in water being wasted. This structure therefore adds to the efficiency of the watering device and to the number of animals which can be adequately served by such a watering device, since the animals will consume substantially all of the water which is emitted from the valves 22 and they will do so at a faster rate than if they were positioned at one side thereof, or if they were being interfered with by an animal drinking from an adjacent nipple valve.

FIG. 7 illustrates an alternate embodiment 10' wherein the base plate 23' is not reversible.

FIGS. 8 and 9 show another alternate embodiment 10" wherein flange members 27" are formed by the vertical sides of a recess in sidewall 11.

Accordingly, it can be seen that the foregoing objects of this invention are achieved by use of the embodiments of this invention which are shown. Obviously, many modifications and variations of the present invention are possible in light of the above teachings. It is therefore to be understood that, within the scope of the appended claims, the invention may be practiced otherwise than as specifically described.

We claim:

1. An animal watering apparatus comprising:
   a housing, said housing including generally vertically disposed sidewalls;
   valve means attached to at least one of said sidewalls and extending outwardly therefrom for allowing animals to drink directly from said valve means whereby contact of said valve means with the inside of the animal's mouth opens the valve means;
   means disposed within said housing and attached to said valve means and extending from said valve means to an underground source of water under pressure for supplying water to said valve means;
   a first flange member attached to said housing and extending outwardly therefrom in the same general direction as said valve means, said first flange member being adjacent to one side of said valve means and being generally vertically disposed;
   a second flange member attached to said housing and extending outwardly therefrom in the same general direction as said valve means, said second flange member being adjacent to an opposite side of said valve means and being generally vertically disposed whereby said valve means is disposed intermediate the first flange member and the second flange member;
   a base plate extending between said first and second flange members and being attached to said first and second flange members at their innermost ends adjacent to said housing, an opening being disposed in said base plate and said valve means extending through said opening, said base plate including an extending portion extending vertically beyond said first and second flange members; and
   means attached to said housing and to said base member for selectively moving said base member between a first position wherein the first and second flange members are above said extending portion of the base plate and a second position wherein the first and second flange members are below the extending portion whereby the drinking height of the animal watering apparatus is adjustable.

2. The animal watering apparatus of claim 1 wherein: a surface of the first flange member and a surface of the second flange member is disposed at an oblique angle to a surface of the housing to which the first flange member and second flange member are attached.

* * * * *